(12) United States Patent
Lespagnol

(10) Patent No.: US 7,068,653 B2
(45) Date of Patent: Jun. 27, 2006

(54) DATA PACKET SWITCHING NODE ACCOMMODATING VERY HIGH BIT RATE INTERFACES

(75) Inventor: Albert Lespagnol, St Cyr l'Ecole (FR)

(73) Assignee: Alcatel, Paris (FR)

( * ) Notice: Subject to any disclaimer, the term of this patent is extended or adjusted under 35 U.S.C. 154(b) by 953 days.

(21) Appl. No.: 09/975,961

(22) Filed: Oct. 15, 2001

(65) Prior Publication Data

US 2002/0064162 A1    May 30, 2002

(30) Foreign Application Priority Data

Oct. 18, 2000  (EP)  ................................. 00440281

(51) Int. Cl.
*H04L 12/28* (2006.01)
*H04L 12/56* (2006.01)
*H04J 3/16* (2006.01)

(52) U.S. Cl. .............. 370/390; 370/395.1; 370/395.71; 370/413; 370/470

(58) Field of Classification Search ................ 370/358, 370/391, 536, 538, 540, 543–545, 390, 395.1, 370/395.71, 395.72, 413, 429, 470
See application file for complete search history.

(56) References Cited

U.S. PATENT DOCUMENTS

| 5,237,564 | A | | 8/1993 | Lespagnol et al. | |
| 5,365,519 | A | * | 11/1994 | Kozaki et al. | 370/378 |
| 5,440,550 | A | | 8/1995 | Follett | |
| 5,905,725 | A | | 5/1999 | Sindhu et al. | |
| 6,351,466 | B1 | * | 2/2002 | Prabhakar et al. | 370/413 |

OTHER PUBLICATIONS

Chiussi F M et al: "Generalized Inverse Multiplexing of Switched ATM Connections", IEEE Global Telecommunications Conference, US, New York, NY: IEEE, 1998, pp. 3134-3140.

* cited by examiner

*Primary Examiner*—Afsar Qureshi
(74) *Attorney, Agent, or Firm*—Sughrue Mion, PLLC

(57) ABSTRACT

A data packet switching node, for use in an asynchronous digital network, that has an input stage that cuts data packets into segments of constant length, a switching matrix having input ports and output ports supporting identical bit rates B switching the segments and an output stage reconstructing the data packets from the segments supplied by the output ports of said switching matrix. The input stage has at least one input interface with a bit rate equal to a multiple of B, $ki*B$, and splits the data packet into $ki$ input ports of the switching matrix. The output stage has at least one output interface with a bit rate equal to a multiple of B, $ko*B$, and reconstructs a data packet with a bit rate equal to $ko*B$ by concatenating segments supplied by $ko$ output ports of the switching matrix where $ki*ko>1$.

20 Claims, 2 Drawing Sheets

DATA PACKET SWITCHING NODE ACCOMMODATING VERY HIGH BIT RATE INTERFACES

BACKGROUND OF THE INVENTION

The present invention relates to a data packet switching node to be used in an asynchronous digital network.

A frame switching relay is described in U.S. Pat. No. 5,237,564. According to this patent, such a frame switching relay comprises n input ports and n output ports each of them having an identical binary bit rate D. The switching relay comprises a time base at a frequency that is integral multiple of the binary rate D. From this time base and by means of frequency dividers, numerous clock signals required for the various functions of the frame switching relay are derived. As a consequence, the internal implementation of the frame switching relay is determined by the bit rate D of the input and output ports.

However, the implementation of a switching fabric with ports supporting very high bit rates (i.e., 9.6 Gbps and above) is at the limit of technological feasibility and as a consequence very expensive. Indeed, even if a packet switching relay has only to accommodate one port at 9.6 Gbps, all other ports being used at lower bit rates, the frame switching relay must be designed as if all ports were to accommodate a bit rate of 9.6 Gbps. A further disadvantage is that the resource of the switching fabric are wasted if the whole switching fabric is designed for very high bit rates while several ports accommodate lower bit rates.

SUMMARY OF THE INVENTION

Therefore, an aspect of the present invention is to provide a simplified implementation of a data packet switching node able to switch very high bit rates (i.e., bit rates higher than the bit rate for which the switching node is designed).

This aspect, and others that appear below, are achieved by a data packet switching node to be used in an asynchronous digital network. The data packet switching node comprises an input stage, cutting data packets into segments of constant length, a switching matrix for switching, said switching matrix having input ports and output ports supporting identical bit rates B;

and an output stage reconstructing said data packets from said segments supplied by said output ports of said switching matrix, wherein said input stage comprises at least one input interface with a bit rate equal to a multiple of B, ki*B, and means for splitting data packets received on said interface into segments distributed to ki input ports of said switching matrix;

said output stage comprises at least one output interface with a bit rate equal to a multiple of B, ko*B, and means for reconstructing a data packet with a bit rate equal to ko*B by concatenating segments supplied by ko output ports of said switching matrix; and ki*ko>1.

An advantage of the present invention is to extend the capabilities of a usual data packet switching node without modifying the core of the switching matrix.

Another advantage of the present invention is flexible configuration of the input and output ports of a usual data packet switching matrix according to the needs.

In an embodiment of the present invention, the ports can be dynamically configured depending on the bit rate supported by the input interface.

The data packet switching node according to the present invention can be used in an ATM switch, a frame relay switch, an IP router or in any other device combining ATM switching and IP routing.

This invention is based on a priority application EP 00 44 02 81.4 which is hereby incorporated by reference.

BRIEF DESCRIPTION OF THE DRAWINGS

Other characteristics and advantages of the invention will appear on reading the following description of an embodiment given by way of non-limiting illustrations, and from the accompanying drawings, in which.

DETAILED DESCRIPTION OF THE INVENTION

Figure 1:
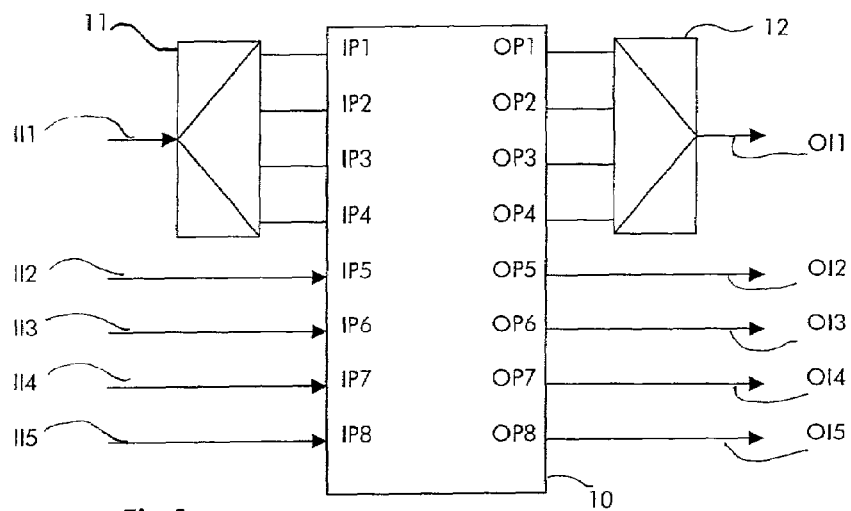
FIG. 1 shows an embodiment of a data packet switching node according to the present invention.

FIG. 1 shows an embodiment of a data packet switching node 10 according to the present invention. Data packet switching node 10 comprises eight input ports IP1, IP2, IP3, IP4, IP5, IP6, IP7, IP8 and eight output ports OP1, OP2, OP3, OP4, OP5, OP6, OP7, OP8. All input and output ports are designed to support an identical bit rate B (e.g., B=2.4 Gbps).

According to the present invention, data packet switching node 10 can accommodate one input interface II1 with a bit rate of k*B (e.g., if k=4 k*B=9.6 Gbps i.e., interface OC192c) in that 4 input ports IP1, IP2, IP3 IP4 are bundled together. Each of the remaining four input ports IP5, IP6, IP7, IP8 accommodate an input interface II2, II3, II4, II5 with a bit rate of B (i.e., interface OC48c).

Input interface II1 is connected over splitter 11 to input ports IP1, IP2, IP3, IP4. Input ports IP5, IP6, IP7, IP8 are directly connected to respectively input interfaces II2, II3, II4 II5.

According to the present invention, data packet switching node 10 can accommodate one output interface OI1 with a bit rate of 9.6 Gbps (interface OC192c) in that 4 output ports OP1, OP2, OP3, OP4 are bundled together. Each of the remaining four output ports OP5, OP6, OP7, OP8 accommodate an output interface OI2, OI3, OI4, OI5 with a bit rate of 2.4 Gbps (interface OC48c).

Output ports OP1, OP2, OP3, OP4 are connected over multiplexer 12 to output interface OI1. Output ports OP5, OP6, OP7, OP8 are directly connected to respectively output interfaces OI2, OI3, OI4, OI5.

This configuration is chosen for sake of simplicity, any other configurations may be envisaged. A more general configuration being n input and output ports, k input interfaces each input interface being associated a certain number of input ports, k' output interfaces each output interface being associated a certain number of output ports. The following inequalities should be fulfilled:

$$\sum_{i=1}^{k} (nip)_i \leq n$$

$$\sum_{i=1}^{k'} (nop)_i \leq n$$

where:

$(nip)_i$ is the number of input ports associated to the ith input interface, $(nop)_i$ is the number of output ports associated to the ith output interface.

It is the role of splitter 11 to split data packets received on input interface I1 into segments of constant length and successively retransmit them on one of input ports IP1 to IP4 with a bit rate four times lower than the one received on input interface I1. Preferably, segments are cyclically retransmitted on input ports I1, IP2, IP3 IP4.

Figure 2:
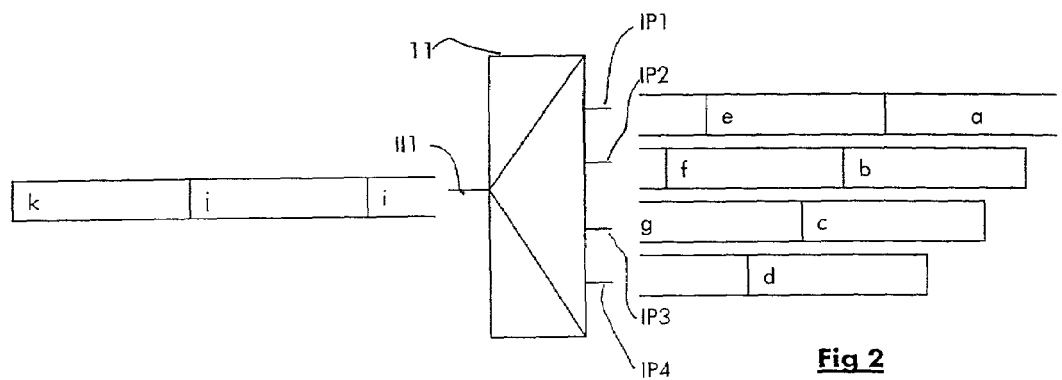
FIG. 2 shows an example of inverse multiplexing on an input interface (Ingress Line)

As shown on FIG. 2, if a packet received on input interface I1 can be split in eleven segments a to k, segments number a, e and i are transmitted on input port IP1, segments number b, f and j are transmitted on input port IP2, segments number c, g and k are transmitted on input port IP3 and segments number d and h are transmitted on input port IP4. This function is called "inverse multiplexing in Ingress Line", (Ingress line designing an input interface).

In this example, it is assumed that all packets have the same length, however, this invention is not restricted to the switching of fixed length packets arriving on input interfaces I1, I2, I3, I4 I5. Packets with variable length can be handled the same way in that the packets are cut in segments of identical length, the last segment of a packet being if necessary filled with dummy bits.

It is the role of multiplexer 12 to multiplex segments received on output ports OP1, OP2, OP3, OP4 so as to reconstruct a packet on output interface OI1 having a bit rates four times higher than the bit rate on output ports OP1, OP2, OP3, OP4. Segments are, preferably, cyclically read by multiplexer 12 on output ports OP1, OP2, OP3, OP4 and retransmitted on output interface OI1. This function called "multiplexing in Egress Line" (the term Egress line being an equivalent for output interface). Data packet switching node 10 is responsible for properly assigning the switched segments to the output ports OP1, OP2, OP3, OP4 to guarantee that the segments are multiplexed at multiplexer 12 in the correct order on output interface OI1.

Figure 3:
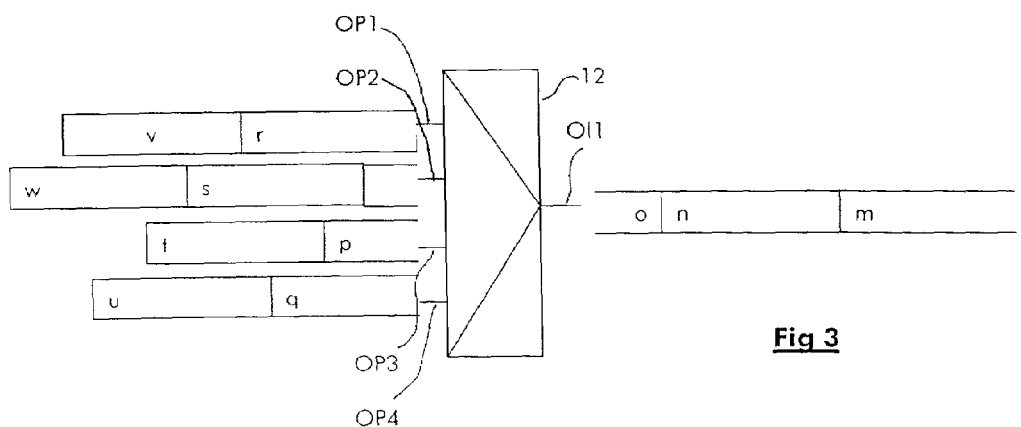
FIG. 3 represents an example of multiplexing on an output interface (Egress Line)

An example for this reconstruction mechanism is given in FIG. 3. If a packet is split in eleven segments m to w, the switching node should assign the segments of the output ports the following way: segments m, q and u should be received on port OP4, segments n, r and v should be received on port OP1, segments o, s and w should be received on port OP2 and segments p and t should be received on output port OP3. The mechanism provided at data packet switching node 10 to preserve the correct order of the packet will be described below.

Figure 4:
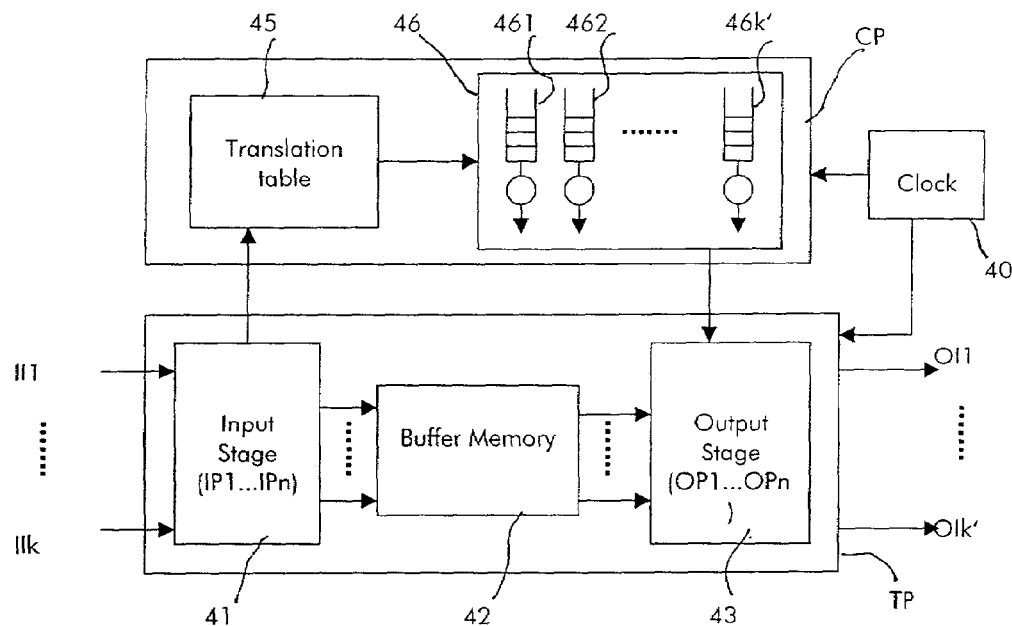
FIG. 4 shows a bloc diagram of a data packet switching node according to the invention.

FIG. 4 illustrates a block diagram for a data packet switching node according to the invention. Data packet switching node comprises a clock 40, a transport plane TP and a control plane CP.

Transport plane TP comprises an input stage 41, a buffer memory 42, an output stage 43. Input stage 41 is connected to the input interfaces I1 to Iik and to buffer memory 42.

Output stage 43 is connected to buffer memory 42 and to output interfaces OI1 to Oik'. The n input ports IP1 to IPn and splitter 11 are also part of input stage 41. As well, the n output ports OP1 to OPn and multiplexer 12 are part of output stage 43.

The mechanism for splitting a packet into segments in input stage 41 has already been described by means of FIG. 2. As well, the mechanism for reconstructing a data packet in output stage 43 has already been described by means of FIG. 3.

Clock 41 gives the clock frequency for the data packet switching node.

Preferably, if there are n input ports, each segment is virtually divided in n equally long parts called words in the following, a clock period corresponding to the time needed to write a word in an input queue.

If the clock is coded on five bits (0 to 31), the memory contains enough places for storing 32 segments.

The segments received on input ports IP1 to IPn are synchronized so that the beginning of a segment received on input port IPi is delayed by one word (one clock period) compared to the beginning of the segment received on the previous input port IP(i−1).

Such an organization of the input queues enables a high parallel management in the data packet switch node. The buffer memory management will be described in the following.

At each clock period, it is the turn of the next input port to write an available segment waiting in an input queue in the buffer memory 42.

At clock period i, the available segment is stored in at location i of buffer memory 42.

Figure 5:
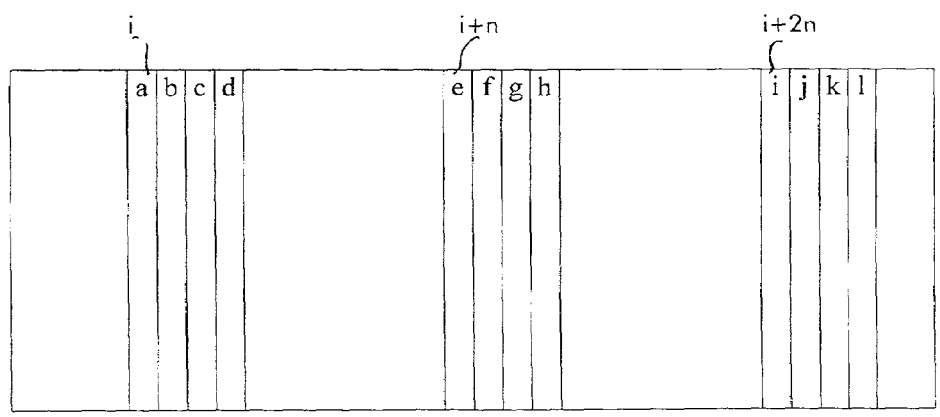
FIG. 5 represents the contents of the buffer memory storing the segments of a packet received on a very high speed interface.

FIG. 5 represents the contents of the buffer memory storing the segments of a packet comprising twelve segments a to l received on input interface I1.

For example, if input ports IP1 to IP4 are associated to input interface I1, segment a of the packet received at clock period i on port IP1 is stored at location i of buffer memory 42, segment b received at clock period i+1 on port IP2 is stored at location (i+1) MOD(n), segment c received at clock period i+2 on port IP3 is stored at location (i+2) MOD(n), segment d received at clock period i+3 on port IP4 is stored at location (i+3) MOD(n), Segments (not represented on FIG. 5) stored between location (i+4) MOD(n) and (i+n−1) MOD(n) are segments received on input ports IP5 to IPn.

segment e received at clock period i+4 on port IP1 is stored at location (i+n) MOD(n), segment f received at clock period i+5 on port IP2 is stored at location (i+n+1) MOD(n), segment g received at clock period i+6 on input port IP3 is stored at location (i+n+2) MOD(n), segment h received at clock period i+7 on port IP4 is stored at location (i+n+3) MOD(n), Segments (not represented on FIG. 5) stored between location (i+n+4) MOD(n) and (i+2*n−1) MOD(n) are segments received on input ports IP5 to IPn.

segment i received at clock period i+8 on port IP1 is stored at location (i+2n) MOD(n), segment j received at clock period i+9 on port IP2 is stored at location (i+2n+1)MOD(n) and so on.

This way of storing the segments in buffer memory 42 enables it to easily retrieve an implicit link between all segments of a packet.

In the following, FIG. 4 is further described.

The control plane CP comprises a translation table 45 and a traffic management module 46 comprising k' control queues (each one associated to an output interface) 461 to 46k'.

Translation table 45 contains routing information that is to say to which output interface(s) the packets arriving on an input interface should be switched to. Translation table 45 is preferably able to control the switching for several virtual connections on one input/output port simultaneously.

The contents of translation table 45 determines the type of switching that is to be performed. Possible alternatives are point to point switching, point to multipoint switching or multipoint to point switching.

In this example, translation table 45 indicates that input interface II1 should be switched to output interface OI1. It is, however, not necessary to switch an input interface with a bit rate k*B to an output interface with the same bit rate. Other routing combinations known by a person skilled in the art are also supported by the present invention.

Translation table 45 comprises also a mapping, stored in a first memory location, between the input ports IP1 to IPn and their corresponding input interface II1 to IIk. As well translation table comprises a mapping, stored in a second memory location, between the output ports OP1 to OPn and their corresponding output interface OI1 to OIk'.

Traffic management module 46 is responsible for controlling the retransmission of a packet stored in the memory buffer 42 on an output interface OI1 to OIk'. Traffic management module 46 controls the provision of quality of service requirements for the different packets. To each output interface are associated as many control queues as available quality of services. In this example and for sake of simplicity, it will be assumed that all packets require the same quality of service and as a consequence only one control queue 461 to 46k' is associated to one output interface OI1 to OIk".

Each time a new packet is completely stored in buffer memory 42, a new entry is added in the control queue to which this packet should be switched according to translation table 45. Each entry in the control queue 46i indicates to output stage 43 the location in buffer memory 42 of the first segment of a packet to be retransmitted on output interface OIi.

Translation table 45 comprises as well the number of consecutive segments belonging to the same packet to be switched on output interface OP1.

The control queues 461 to 46k' are successively and cyclically checked by output stage 43. Depending on the number of output ports associated to an output interface, the corresponding control queue will be checked by output stage 43 during the same number of clock periods. In the preceding example output interface OI1 corresponds to four output ports OP1, OP2, OP3, OP4, then the control queue 461 will be checked for four clock periods before control queue 462 is checked for one clock period and so on.

Control queues 461 to 46k' are handled with the FIFO (First In First Out) principle. At each clock period, the next control queue is checked by output stage 43. If the transmission of a packet has been started and not completed, it is the task of output stage 43 to retrieve in buffer memory 42 the subsequent segment of this packet. This mechanism will be described in the following. No entry is read out of the control queue and output stage 43 jump to the next control queue for the next clock period.

Else, if no packet is currently being transmitted, output stage 43 checks the control queue and read the address of the first segment of a new packet to be retransmitted of buffer memory 42.

It is also the role of output stage 43 to select the appropriate output ports OP1, OP2, OP3, OP4 associated to output interface OI1 to retransmit the segments read out of buffer memory 42. Preferably, the first segment is assigned randomly to one of the output ports associated to the output interface. Each subsequent segment is assigned to the next output port associated to the output interface. Alternatively, the output put is determined automatically from the value of the clock.

The mechanism used by output stage 43 to find the address of subsequent segments once the first segment has been read in the control queue will now be described. The address in buffer memory 42 of the next segment to be transmitted on an output port should be retrieved according to the following algorithm. Several conditions should be checked:

If the previous segment retransmitted on this output port was not the last one of the packet to be retransmitted on this port, the address of the next segment is given by the following table.

|  | Output interface associated to one output port | Output interface associated to k>1 output port |
|---|---|---|
| Input interface associated to one input port | Address of previous segment sent on this port +n | Address of previous segment sent on this port +k*n |
| Input interface associated to k>1 input ports | Address of the previous segment on this port +1 (if previous segment sent on this port was received on input port 1 to k-1) Address of the previous segment on this port + n−k+1 (if previous segment sent on this port was received on input port k) | Address of the previous segment sent on this port +n |

If the previous segment retransmitted on this port was the last one of a packet to be transmitted on this port, two sub-cases should be considered:

If there is a new packet being currently transmitted on the output interface and one of the segment of this packet will be transmitted on this port, then the address of the next segment is given by the following table:

|  | Output interface 461 associated to one output port | Output interface 461 associated to k>1 output ports |
|---|---|---|
| Input interface associated to one input port | Address of previous segment retransmitted on this port +n | Address of previous segment retransmitted on this port +n |
| Input interface associated to k>1 input ports | If previous segment received on input port 1 to k−1 If previous segment received on input port k | Address of the previous segment on this port +1 Address of the previous segment on this port + n−k+1 |

If there is no new packet currently being retransmitted on the output interface to which this port is associated, the address of the segment to be retransmitted on this port is to be read in the control queue 461. It is the address of the first segment of a new packet).

As already described by means of FIG. 3, the segments received on the ports associated to output interface OI1 are then combined to reconstitute the original packet.

In a preferred embodiment of the invention, the association input ports/input interface, output ports/output interface as well as the number of input interfaces, respective output interfaces, should be dynamically configurable according to the needs of the data packet switching node.

The invention claimed is:

1. A data packet switching node to be used in an asynchronous digital network, comprising:
    an input stage, cutting data packets into segments of constant length;
    a switching matrix for switching, said switching matrix having input ports and output ports supporting identical bit rates B; and
    an output stage reconstructing said data packets from said segments supplied by said output ports of said switching matrix, wherein
    said input stage comprises at least one input interface with a bit rate equal to a multiple of B, ki*B, and means for splitting data packets received on said interface into segments distributed to ki input ports of said switching matrix;
    said output stage comprises at least one output interface with a bit rate equal to a multiple of B, ko*B, and means for reconstructing a data packet with a bit rate equal to ko*B by concatenating segments supplied by ko output ports of said switching matrix; and
    ki*ko>1.

2. The data packet switching node according to claim 1, said switching matrix further comprising:
    a first memory location for storing an identifier representing the association between said input interface and said corresponding ki input ports; and
    a second memory location for storing an identifier representing the association between said output interface and said corresponding ko output ports.

3. The data packet switching node according to claim 2, wherein the association between each input interface and corresponding input ports, as well as the association between each output interface and corresponding output ports are dynamically configurable in said first and second memory location.

4. The data packet switching node according to claim 1, said switching matrix further comprising:
    a buffer memory for storing segments belonging to a packet received at said input interface;
    memory writing means for sequentially writing segments received on said ki input ports in said buffer memory;
    a translation table for determining the output interface to which said segments belonging to said packet must be switched;
    a traffic management module for storing the address of the first segment of said packet in said buffer memory; and
    memory reading means for retrieving consecutive segments belonging to said packet in said buffer memory and cyclically assigning each of said segments to one of said ko output ports associated to said output interface.

5. The data packet switching node according to claim 1, dedicated to be used in an ATM switch to switch fixed length data packets supplied on said input interface.

6. The data packet switching node according to claim 1, dedicated to be used in an IP router to switch variable length data packets supplied on said input interface.

7. The data packet switching node according to claim 1, dedicated to be used in an equipment providing both IP routing and ATM switching functions.

8. The data packet switching node according to claim 1, said switching matrix further comprising:
    a buffer memory for storing segments belonging to a packet received at said input interface;
    a memory write circuit for sequentially writing segments received on said ki input ports in said buffer memory;
    a translation table for determining the output interface to which said segments belonging to said packet must be switched;
    a traffic management module for storing the address of the first segment of said packet in said buffer memory; and
    a memory read circuit for retrieving consecutive segments belonging to said packet in said buffer memory and cyclically assigning each of said segments to one of said ko output ports associated to said output interface.

9. The data packet switching node according to claim 1, wherein variable length data packets are cut into segments of identical length, and, if necessary, the last segment of a variable length packet is filled with dummy bits so as to equalize the length of all the segments.

10. A data packet switching node to be used in an asynchronous digital network, comprising:
    an input stage, cutting data packets into segments of constant length;
    a switching matrix for switching, said switching matrix having input ports and output ports supporting identical bit rates B;
    a buffer memory for storing segments of a packet received at said input stage, wherein a memory location for storing segments is based on a clock period as measured from receipt of an initial segment and the modulo of the number of input ports of said switching matrix; and
    an output stage reconstructing said data packets from said segments supplied by said output ports of said switching matrix; wherein
    said input stage comprises at least one input interface with a bit rate equal to a multiple of B, ki*B, and means for splitting data packets received on said interface into segments distributed to ki input ports of said switching matrix;
    said output stage comprises at least one output interface with a bit rate equal to a multiple of B, ko*B, and means for reconstructing a data packet with a bit rate equal to ko*B by concatenating segments supplied by ko output ports of said switching matrix; and
    ki*ko>1.

11. The data packet switching node according to claim 10, said switching matrix further comprising:
    a first memory location for storing an identifier representing the association between said input interface and said corresponding ki input ports; and
    a second memory location for storing an identifier representing the association between said output interface and said corresponding ko output ports.

12. The data packet switching node according to claim 11, wherein the association between each input interface and corresponding input ports, as well as the association between each output interface and corresponding output ports are dynamically configurable in said first and second memory location.

13. The data packet switching node according to claim 10, said switching matrix further comprising:
   a memory write circuit for sequentially writing segments received on said ki input ports in said buffer memory;
   a translation table for determining the output interface to which said segments belonging to said packet must be switched;
   a traffic management module for storing the address of the first segment of said packet in said buffer memory; and
   a memory read circuit for retrieving consecutive segments belonging to said packet in said buffer memory and cyclically assigning each of said segments to one of said ko output ports associated to said output interface.

14. The data packet switching node according to claim 10, dedicated to be used in an ATM switch to switch fixed length data packets supplied on said input interface.

15. The data packet switching node according to claim 10, dedicated to be used in an IP router to switch variable length data packets supplied on said input interface.

16. The data packet switching node according to claim 10, dedicated to be used in an equipment providing both IP routing and ATM switching functions.

17. A method for operating a data packet switching node comprising a switching matrix having input ports and output ports supporting identical bit rates B, an input stage comprising at least one input interface with a bit rate equal to a multiple of B, and an output stage comprising at least one output interface with a bit rate equal to a multiple of B, said method comprising:
   cutting input data packets into segments of constant length;
   distributing split data packets to ki input ports of said switching matrix;
   switching segments within said switching matrix; and
   reconstructing a data packet by concatenating segments supplied by ko output ports of said switching matrix, wherein ki*ko>1.

18. The method according to claim 17, said method further comprising:
   storing, in a first memory location, an identifier representing the association between said input interface and said corresponding ki input ports; and
   storing, in a second memory location, an identifier representing the association between said output interface and said corresponding ko output ports.

19. The method according to claim 18, wherein the association between each input interface and corresponding input ports, as well as the association between each output interface and corresponding output ports are dynamically configurable in said first and second memory location.

20. The method according to claim 17, wherein variable length data packets are cut into segments of identical length, and, if necessary, the last segment of a variable length packet is filled with dummy bits so as to equalize the length of all the segments.

* * * * *